(12) United States Patent
Nikolai et al.

(10) Patent No.: US 8,010,723 B2
(45) Date of Patent: Aug. 30, 2011

(54) SAFETY CONTROLLER WITH DATA LOCK

(75) Inventors: Horst-Dieter Nikolai, Michaelstadt (DE); Volker Rug, Michaelstadt (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 12/340,926

(22) Filed: Dec. 22, 2008

(65) Prior Publication Data

US 2009/0177290 A1 Jul. 9, 2009

(30) Foreign Application Priority Data

Dec. 27, 2007 (DE) .......................... 10 2007 063 291

(51) Int. Cl.
*G06F 13/00* (2006.01)
*G06F 13/36* (2006.01)

(52) U.S. Cl. .......... 710/108; 710/36; 710/107; 710/305; 710/309; 710/315; 700/18; 700/21

(58) Field of Classification Search .......................... None
See application file for complete search history.

(56) References Cited

U.S. PATENT DOCUMENTS

| 4,213,178 | A | * | 7/1980 | Diez et al. ........................ 714/55 |
| 4,257,098 | A | * | 3/1981 | Lacy ................................ 714/49 |
| 4,571,672 | A | * | 2/1986 | Hatada et al. ................... 711/152 |
| 4,760,518 | A | * | 7/1988 | Potash et al. .................... 710/107 |
| 4,862,354 | A | * | 8/1989 | Fiacconi et al. ................. 709/216 |
| 5,610,808 | A | * | 3/1997 | Squires et al. ..................... 700/2 |
| 5,832,297 | A | * | 11/1998 | Ramagopal et al. .............. 710/5 |
| 6,430,639 | B1 | * | 8/2002 | Meyer et al. .................... 710/200 |
| 6,532,508 | B2 | * | 3/2003 | Heckel et al. ................... 710/110 |
| 2003/0236937 | A1 | * | 12/2003 | Barros De Almeida et al. .............................. 710/305 |
| 2004/0230323 | A1 | * | 11/2004 | Glanzer et al. ................... 700/18 |
| 2006/0229737 | A1 | * | 10/2006 | Esch et al. ......................... 700/1 |
| 2006/0242535 | A1 | * | 10/2006 | Barthel et al. ................. 714/758 |
| 2007/0124115 | A1 |   | 5/2007 | Buttner et al. ................. 702/186 |
| 2007/0180286 | A1 | * | 8/2007 | Oster et al. ......................... 714/2 |
| 2008/0126718 | A1 | * | 5/2008 | Kottke et al. ................... 711/154 |

FOREIGN PATENT DOCUMENTS

| DE | 10219501 A1 | * | 11/2003 |
| DE | 10 2004 018 857 | | 11/2005 |
| WO | WO 2005013022 A1 | * | 2/2005 |

\* cited by examiner

*Primary Examiner* — Henry W Tsai
*Assistant Examiner* — Steven Snyder
(74) *Attorney, Agent, or Firm* — Michael J. Striker

(57) ABSTRACT

The present invention relates to a SPC comprising at least one data processing means for realizing a first data channel 1 and a second data channel 2, and comprising a data transmission means 3 which is connected to data channels 1,2 in a manner such that, using data transmission means 3, data may be transferred from at least one data channel 1, 2 to a higher-order device 5 that is connectable to the controller.
The object of the present invention is to further increase the safety of safety controllers. This aim is achieved by providing an active data lock 4, using which it is possible to influence the data transmission—which may be realized using data transmission means 3—to higher-order device 5.
As a result, only error-free data are sent via higher-order device 5 to external I/O assemblies.

16 Claims, 2 Drawing Sheets

SAFETY CONTROLLER WITH DATA LOCK

BACKGROUND OF THE INVENTION

The present invention comes from the field of automation technology, in particular from the field of programmable controllers, in particular from the field of safety controllers; it describes a device for increasing the safety of application processes, and it describes a method for operating a controller of this type.

It is critical that individuals be protected against uncontrolled machine movements in the case of machine tools, printing presses, and packaging machines, and in applications related to assembly, handling, and robots. All machine manufacturers must perform a hazard analysis and risk assessment in the process of designing their machines. In order to fulfill these very high requirements, "safety controllers" must be used to control the machines.

DE 102004018857 A1 shows a safety controller from the prior art. The aim of the solution described here is to provide a method and a device for controlling safety functions within the framework of a system controller that is not directed to safety functions, wherein the safety program which includes all of the safety functions is characterized by a low level of complexity and the fact that it may be run in any unsafe program environment without the risk that faults that occur in the control of non-safety-relevant control functions will cause a fault to occur in the control of safety functions.

Application processes in combination with safety controllers are typically realized using a controller and a large number of field controllers. The task of the field controllers is to detect or monitor the process states, and to transfer this process-relevant information to the controller, or to receive process-relevant information from the controller. Field controllers may be, e.g. sensors, probes, motion alarms, and electrical drives. The field controller and the controller are connected, e.g. via "input/output means" (I/O assemblies). The I/O assemblies may communicate with the controller, e.g. via a field bus. The I/O assemblies may be arranged in a hierarchy, and they are typically connected to a field bus via a "field bus head". A secure controller also includes secure I/O assemblies.

The applicant currently offers a distributed communication system with a ring-type structure on the market, called the SERCOS Interface® (SErial Real Time COmmunication System). This system is suitable for use as a field bus in safety-related applications, although this is not mandatory. The participants are typically connected to a central participant (e.g. the controller) via optical waveguides. The SERCOS interface® specifies strictly hierarchical communication. Data are exchanged in the form of data blocks, the "telegrams" or "frames", between the controller (master) and the substations (slaves) in temporally constant cycles. The further participants and/or substations do not communicate directly with one another. In addition, data contents are specified, i.e., the significance, depiction, and functionality of the transmitted data are predefined to a significant extent. In the SERCOS interface®, the connection of the controller to the ring is the master, and the connection of one or more substations (drives or I/O assemblies) is the slave. A plurality of rings may be linked to one controller, with the controller being responsible for coordinating the individual rings with one another. This is not specified by the SERCOS interface®. Alternative field bus standards would be Profibus or CAN bus.

The basic prerequisite for components of a safety application is that they adopt a safe state if a malfunction occurs. A "safe state" refers to a state in which a potential hazard is reliably prevented. In the field of automation technology, the energy-free state is typically a safe state. "Secure" field busses which may be based, e.g. on the SERCOS interfaced described above, are used for communication in these applications. Safety-relevant components must also comply with applicable standards, such as IEC 61508, and they must be certified by certification agencies, e.g. TÜV. In addition, there are various safety levels SIL 1-4 to which these assemblies may be assigned.

The controllers known from the prior art typically operate using at least one data processing means in order to realize at least two data channels, and they preferably operate using one data separator, via which it is possible to combine the two data channels and store them in one memory means. The data may also be stored in a memory without using a separator, and they may then be checked for correctness. A higher-order data processing unit may access the memory and read out the data. The higher-order data processing unit is typically a host system, e.g. a field bus system (Profibus, SERCOS, etc.).

Approaches for realizing safety controllers that are known from the prior art may be susceptible to error and therefore pose a safety risk if the memory means may be accessed at any time and in an uncontrolled manner. This means that, regardless of whether the data in the memory means are complete or correct, an accessing of data that are theoretically incomplete and, therefore, insecure, could take place.

SUMMARY OF THE INVENTION

The object of the present invention is to further increase the safety of safety controllers.

The present invention achieves this aim by using a controller comprising at least one data processing means for realizing a first data channel and a second data channel, and comprising a data transmission means which is connected to the two data channels in a manner such that, using the data transmission means, data may be transferred from at least one data channel to a higher-order device that is connectable to the controller, wherein, according to the present invention, an active data lock is provided, using which it is possible to influence the data transmission—which may be realized using data transmission means—to the higher-order device.

The data processing means is an arithmetic logic unit (microcontroller, CPU) which may realize several (real-time) data channels simultaneously. It is also possible, of course, to use several arithmetic logic units in parallel, which are realized on the same silicon, or which are constructed separately. The actual design depends on the application and the future data volume. The solution according to the present invention has the advantage that data may be transmitted to the higher-order device at a definable point in time, and that the higher-order device does not receive an access right until the data to be read are valid. The solution according to the present invention may be used in combination with all available protocols (SERCOS, Profibus, etc.), even if the secure protocol to be transmitted is based, e.g. on an uneven number of bytes. Using the idea according to the present invention, colliding accesses of the data transmission means due to data being accessed by several entities (arithmetic logic units, higher-order devices, channels) may be prevented, and the data transmission becomes controllable, thereby simplifying, in particular, compliance with specifications from certification agencies for safety-relevant applications. The present invention may be realized, e.g. as a multi-channel and independent SPC, or as a safety module that performs the function of a safety controller in conjunction with other components of the drive technology (closed-loop drive control, open-loop drive control, SPC, NC, etc.) as an autonomously operating unit independently of the function of the other components. The present invention may also be realized as an optional module for drive-specific peripheral equipment, the function of which may be linked to the function of the peripheral equipment. The higher-order unit or higher-order system could be, e.g. a field bus system (host system) that exchanges process data using the field bus system in a serial manner or, depending on the application, in a parallel manner between the controller according to the present invention and actuators and/or sensors that are connected to the controller. Using the present invention it is possible to prevent the data exchange with actuators and/or sensors if the telegrams that are present and that are used to encapsulate the process data are incorrect or incomplete, and to realize an actively controllable locking of the data transmission. At the same time, time windows having undefined data states may therefore be effectively commented out, thereby preventing invalid data from being processed further by the controller peripheral equipment, and eliminating safety risks.

The method for operating a controller as described above comprises the following method steps:

(Redundant) data processing using the data processing means or using autonomous data channels that exist in parallel with one another, and that may be realized using one or more data processing means; (redundant) data transmission via the data channels to the data transmission means using parallel, independent address busses and data busses; influence the data stream between the channels and/or a connectable, higher-order unit with consideration for a data release signal that may activate or deactivate the data lock. Using the data lock it is possible to transmit data bi-directionally by controlling the data lock using a control signal. Several read accesses to the data transmission means are carried out simultaneously via the channels, thereby enabling data to be transmitted to the data transmission means in a redundant manner via the channels.

Advantageously, at least one of the channels uses a physical data interface for exchanging data with the data transmission means, which is the same physical data interface that the data transmission means uses to exchange data with the data lock. This eliminates the need for additional data lines and data busses.

The control of the data transmission is preferably realized using a data release signal, which may also be realized using the data processing means. The data transmission may therefore be monitored using the data processing means and with consideration for a test result that was generated using the data processing means.

The control of the data transmission using the data release signal may also be realized with consideration for a time-controllable monitoring means. The data are therefore released or locked depending on the result of the monitoring. Preferably, several decision criteria are linked to one another logically in order to realize a data release or a data lock. For example, several channels that are realized using the data processing means may carry out separate test measures regarding the reliability and security of transmitted data, wherein data are not released via a logical AND until the result of the test carried out using, e.g. all channels, and the monitoring means is positive.

The data transmission means is preferably realized using a memory means which may receive several read and/or write accesses at the same time. As a result, the redundant and parallel transmission of identical data from the data processing means (channels) to the data transmission means is made possible, wherein the data lock would be activatable to a connectable, higher-order device with consideration for a data transmission operation.

The data lock is preferably realized using a bi-directional data bus driver which is controllable using an internal control logic, and which is situated between the data transmission means and the connectable, higher-order device. Components of this type make it possible to realize the idea according to the present invention in an economical manner, because these components are mass-produced products that are available in large quantities.

Very particularly preferably, a test means is provided which may be used to test the functionality of the data lock. Preferably, the test means is controllable using the data processing means and, therefore, using the channels that were realized autonomously of one another, or using at least one of the channels. The channel logic may therefore automatically check the correct functionality of the data lock before the data are transmitted. Of course, the test means could also be checked using an additional device that is included in the controller, or using the time-controllable monitoring means which could also include logic functions (microcontroller). Preferably, the functionality of the data lock is checked, in particular during the initialization of the controller.

As an option, it would also be possible to include more than two data channels, e.g. three or four channels which also operate autonomously of one another, and which are realized using the data processing means or several data processing means. It would be possible, e.g. to transmit protocols in which the transmitted data capacity is n×8 bits or n×16 bits or n×32 bits, with n=1,2,3, etc. (n=even number) in a manner such that one channel transmits one byte or a double byte or 32 bits, these data then being recombined via the data transmission means and, optionally, via the connectable, higher-order unit to form a secure protocol.

The safety controller according to the present invention is preferably realized as a plug-in module for an industrial PC which enables real-time control independently of the PC peripheral equipment. Any PC may therefore be upgraded to a safety SPC in an economical manner. The connection to the PC hardware could be realized using the PCI interface or other known types of PC interfaces.

As an alternative, the controller according to the present invention could also be included in a drive control device, thereby resulting in a combination of an open-loop drive control and a closed-loop drive control, which is usable for safety-critical applications, and which is particularly compact.

As another alternative, it would be possible to expand a standard SPC with a safety controller according to the present invention which is realized, e.g. as a plug-in module for a standard SPC. The standard SPC functionality which is still present could therefore be used for non-safety-critical processes, while safe operation of input and output assemblies would be possible in parallel and fully autonomously, or with consideration for implemented standard processes.

Via the present invention, a system for the safe control of input and output assemblies is preferably realized, the system including at least one of the aforementioned devices according to the present invention, wherein a higher-order device is provided between the device and the input and output assemblies that must be controlled in a safe manner, and via which data are transmittable between the device and the safe input and output assemblies using a secure data protocol.

DETAILED DESCRIPTION OF THE PREFERRED EMBODIMENTS

Figure 1:
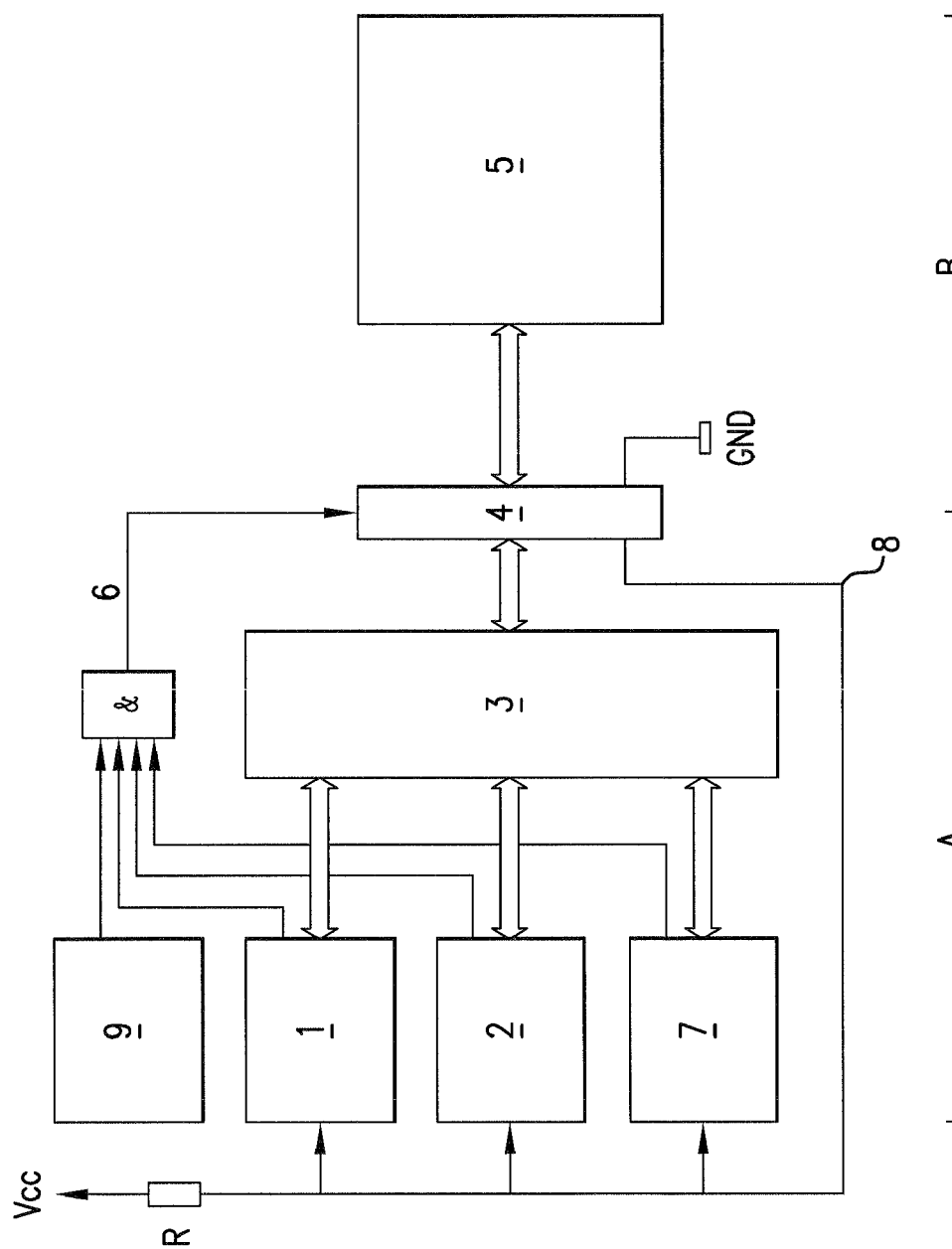
FIG. 1 schematically shows a system according to the present invention for locking incorrect or incomplete, safety-relevant telegrams using a host lock.

FIG. 1 shows a system according to the present invention for locking incorrect or incomplete, safety-relevant telegrams using a host lock. This system includes a safety-relevant side A, and a non-safety-relevant side B. The operations carried out on side A require special measures so that no serious safety risks may occur during operation of a system that is run using the controller. The operations that take place on side B are limited to the transmission of data that have been secured using a secure protocol. Side B is referred to as they gray channel. The gray channel is situated, e.g. between secure I/O interfaces which will be controlled, and the safety controller.

The safety controller shown in FIG. 1 includes a watch dog 9 that may be implemented as an option, a first channel 1, a second channel 2, a third and optional channel 7, bi-directional address busses and/or data busses (black double arrow), a transmission memory 3 (e.g. Dualport RAM, Triport RAM, depending on the number of channels 1,2,7), a host system 5 (field bus, etc.), a host lock 4, an AND gate & with output signal 6, and a test system 8 with pull-up after Vcc on safety-relevant side A, and a GND connection on non-safety-relevant side B.

The safety-relevant telegrams that are generated by the safety controller (and that are secured via a safety protocol) are stored in transmission memory 3 via channels 1, 2, 7. Since incomplete, faulty, or unchecked telegrams could accumulate in transmission memory 3 during this phase of data storage, host system 5 is initially blocked via host lock 4 from accessing transmission memory 3. Host 5 is allowed to access transmission memory 3 via host lock 4 only when individual channels 1,2,7 have verified that the output messages in transmission memory 3 are secure. Every single channel 1,2,7 must provide its approval explicitly for host lock 4 to be released; time "gaps" during which host 5 could read out the "non-secure" telegrams are therefore commented out. Host lock 4 itself is composed of bi-directional data bus drivers and uni-directional address bus drivers, and may be controlled via control signal 6. In addition, in this embodiment, a discrete watch dog 9 (e.g. a microcontroller for the time-based and logical program execution monitoring of channels 1,2,7) must provide its approval for host lock 4 to be released. If errors occur in the time-based and/or logical program execution monitoring of channels 1,2,7, this is detected by discrete watch dog 9, which permanently activates host lock 4, thereby preventing host 5 from reading out new telegrams from transmission memory 3. In this example, control signal 6 is delivered by a gate & which logically links the verification results of channels 1,2,7 and watch dog 9 with one another in a manner such that a control signal 6 results only when the results of all verification tests are positive.

The testability of the functionality of host lock 4 is ensured by one or more return signal(s) 8. Signals 8 are composed, e.g. of one or more bits of the address bus driver of host lock 4, which were connected between GND and a pull-up R, and the potential of which may be tapped via channels 1,2,7 or one data processing unit to realize channels 1,2,7.

Due to the present invention, the locking of the output data transfer (safety protocol) takes place directly at the transmission point to higher-order device 5 (e.g. field bus). The data transmission is released only when a valid, tested protocol is available. Watch dog 9 is a second shut-off path which increases safety even further. This concept according to the present invention, in the form of an assembly, could be used in highly diverse variations of controllers (rack solution, PC solution, etc.). The present invention converts a standard controller to a multi-channeled safety controller.

Figure 2:
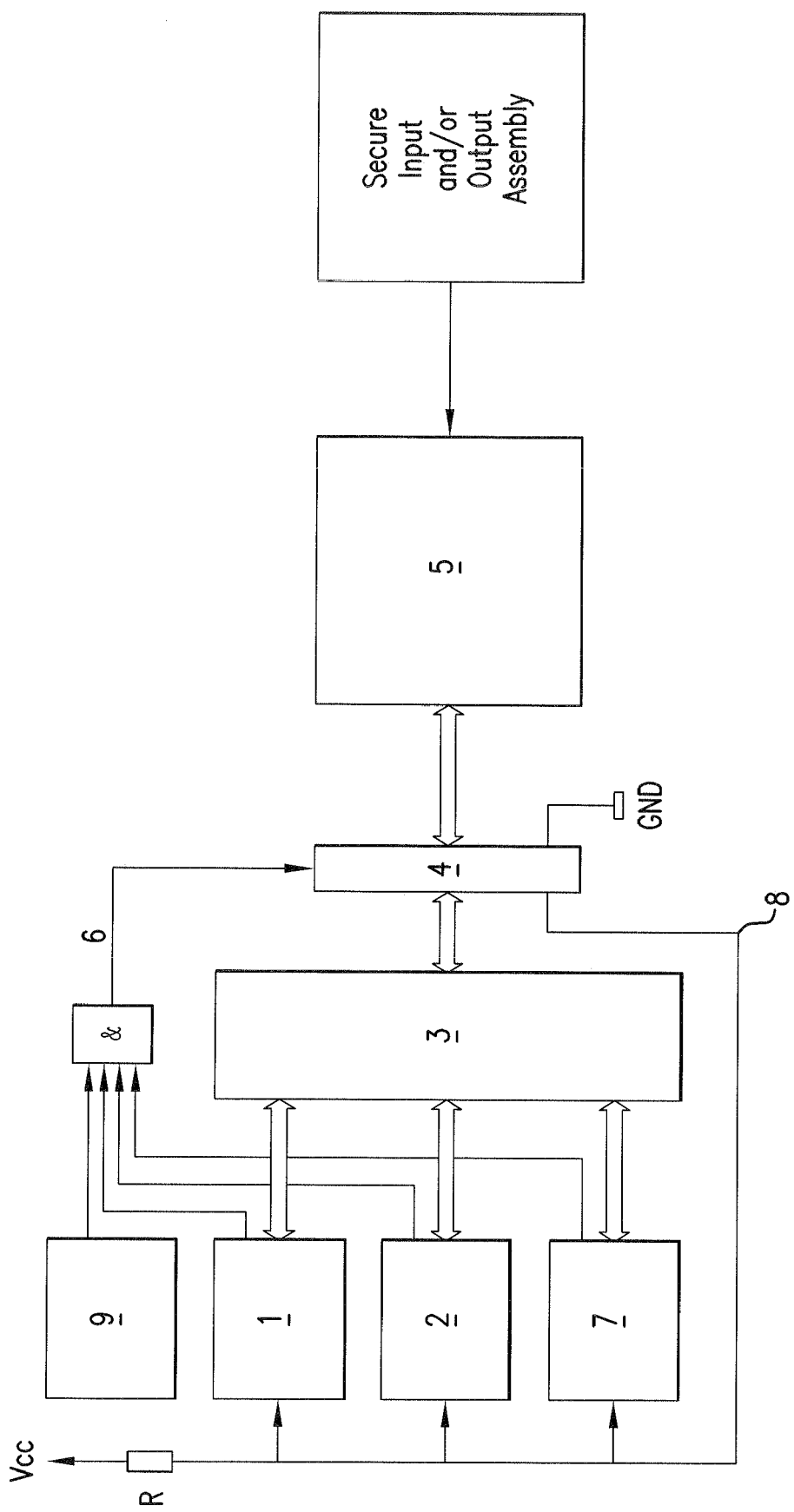
FIG. 2 schematically shows the system of FIG. 1 with a higher-order unit disposed between the system and a secure input and/or output assembly.

FIG. 2 shows schematically the system described above with reference to claim 1, with the higher-order unit 5 disposed between the system and a secure input and/or output assembly.

What is claimed is:

1. A controller, comprising:
    at least one data processing means for realizing a first data channel (1) and a second data channel (2);
    a data transmission means (3) connected to said first and second data channels (1, 2), wherein said data transmission means (3) is configured to transfer data from at least one of said first and second data channels (1, 2) to a higher-order device (5) that is connectable to the controller and
    a host lock (4) wherein said host lock (4) is configured to influence the data transmission to said higher-order device (5), wherein said host lock (4) comprises bi-directional data bus drivers and uni-directional address bus drivers and is controlled via a data release signal (6), wherein said data transmission is realized using said data transmission means (3), and
    wherein at least one channel (1, 2) is configured to use a physical data interface for the data exchange with the data transmission means (3), wherein said physical data interface is the same data interface that uses the data transmission means (3) to exchange data with the host lock (4).

2. The controller as recited in claim 1, wherein the influencing of the data transmission is realized using said data release signal (6), wherein said data processing means is configured to generate said data release signal (6).

3. The controller as recited in claim 1, wherein influencing of the data transmission is realized using a data release signal (6), and further comprising a time-controllable monitoring means (9) configured to generate said data release signal (6).

4. The controller as recited in claim 1, wherein the data transmission means (3) is realized using a memory means, wherein said memory means is configured to be accessed several times simultaneously.

5. The controller as recited in claim 1, wherein the bi-directional data bus driver is controllable using an internal control logic, wherein said bi-directional data bus driver is situated between the data transmission means (3) and the connectable, higher-order device (5) via at least one bus.

6. The controller as recited in claim 1, further comprising a test means (8), wherein said test means (8) is configured to test the functionality of the host lock (4).

7. The controller as recited in claim 1, wherein more than two data channels (1, 2, 7) are included.

8. The controller as recited in claim 1, wherein said controller is realized as a plug-in module for an industrial personal computer (PC).

9. The controller as recited in claim 1, wherein said controller is included in a drive control device.

10. The controller as recited in claim 1, wherein said controller is included in a safety personal computer (SPC).

11. A system for safely controlling at least one secure input assembly and/or output assembly, comprising:
    a controller, said controller comprising at least one data processing means for realizing a first data channel (1) and a second data channel (2); a data transmission means (3) connected to said first and second data channels (1, 2), wherein said data transmission means (3) is configured to transfer data from at least one of said first and second data channels (1, 2) to a higher-order device (5) that is connectable to the controller; and a host lock (4) wherein said host lock (4) is configured to influence the data transmission to said higher-order device (5), wherein said host lock (4) comprises bi-directional data bus drivers and uni-directional address bus drivers and is controlled via a data release signal (6), wherein said data transmission is realized using said data transmission means (3), wherein said higher-order device (5) is provided between the controller and the secure input assembly and/or output assembly, wherein said controller is configured to transfer between the controller and the secure input assembly and/or output assembly using a secure data protocol, and wherein at least one channel (1,2) is configured to use a physical data interface for the data exchange with the data transmission means (3), wherein said physical data interface is the same data interface that uses the data transmission means (3) to exchange data with the host lock (4).

12. A method for operating a controller, comprising the following steps:

providing at least one data processing means for realizing a first data channel (1) and a second data channel (2), and comprising a data transmission means (3) connected to data channels (1, 2) in a manner such that, using data transmission means (3), data may be transferred from at least one data channel (1, 2) to a higher-order device (5) that is connectable to the controller;

providing an active host lock (4), wherein said active host lock (4) is configured to influence the data transmission to said higher-order device (5), wherein said host lock (4) comprises bi-directional data bus drivers and uni-directional address bus drivers and is controlled via a control signal (6), wherein said data transmission is realized using said data transmission means (3);

processing data using the data processing means;

transmitting data using the data channels (1, 2) to the data transmission means (3), wherein at least one channel (1, 2) uses a physical data interface for the data exchange with the data transmission means (3), wherein said physical data interface is the same data interface that uses the data transmission means (3) to exchange data with the host lock (4); and influencing the data stream for a device (5) that is connectable to the controller, with consideration for a data release signal (6).

13. The method as recited in claim 12, wherein the data processing means generates a signal for generating the data release signal (6) with consideration for the result of an inspection of the data that were transmitted to data transmission means (3) using the data channels (1,2).

14. The method as recited in claim 12, wherein data transmission means (3) are accessed several times simultaneously via channels (1,2), wherein data are also transmitted to data transmission means (3) via channels (1,2,7).

15. The method as recited in claim 12, wherein data are transmitted bi-directionally using the host lock (4) by controlling the host lock (4) using a data release signal (6).

16. The method as recited in claim 12, wherein the functionality of the host lock (4) is checked during initialization of the controller.

* * * * *